(12) United States Patent
Andre et al.

(10) Patent No.: US 6,904,340 B2
(45) Date of Patent: Jun. 7, 2005

(54) FLIGHT CONTROL INDICATOR FOR AN AIRCRAFT, IN PARTICULAR A TRANSPORT AIRPLANE, INTENDED TO SUPPLY THE THRUST GENERATED BY AT LEAST ONE ENGINE OF THE AIRCRAFT

(75) Inventors: Joan Andre, Colomiers (FR); Jacky Joye, L'Isle Jourdain (FR); Armand Malagoli, Toulouse (FR); François Moulis, Leguevin (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/445,739

(22) Filed: May 28, 2003

(65) Prior Publication Data

US 2004/0215375 A1 Oct. 28, 2004

(30) Foreign Application Priority Data

Apr. 22, 2003 (FR) .......................................... 03 04914

(51) Int. Cl.$^7$ .......................... G05D 1/08; B64C 13/16; G01M 15/00
(52) U.S. Cl. .......................... 701/14; 701/121; 244/234
(58) Field of Search .......................... 701/3, 4, 14, 121, 701/205; 74/491; 244/234, 175, 220, 181, 182, 188, 195, 76 R, 75 R; 73/178 R, 117.4

(56) References Cited

U.S. PATENT DOCUMENTS

| 4,083,518 A | | 4/1978 | Garrison et al. |
| 4,536,843 A | * | 8/1985 | Lambregts ...................... 701/3 |
| 5,152,169 A | * | 10/1992 | Summerfield et al. ...... 73/117.4 |
| 5,299,765 A | * | 4/1994 | Blechen ...................... 244/182 |
| 5,386,954 A | * | 2/1995 | Bissey et al. ............... 244/181 |
| 5,457,634 A | * | 10/1995 | Chakravarty .................... 701/3 |
| 5,696,704 A | | 12/1997 | Semrau |
| 2002/0072831 A1 | | 6/2002 | Blondel et al. |

OTHER PUBLICATIONS

Preliminary Search Report dated Jan. 21, 2004 with English translation.

\* cited by examiner

*Primary Examiner*—Tan Q. Nguyen
*Assistant Examiner*—Dalena Tran
(74) *Attorney, Agent, or Firm*—Stevens, Davis, Miller & Mosher, LLP

(57) ABSTRACT

Flight control indicator for an aircraft, in particular a transport airplane, intended to supply the thrust generated by at least one engine of the aircraft.

The flight control indicator (1) comprises display means (4) which present, on a viewing screen (5), a dial (6) which is graduated in percentage, whose maximum represents the maximum thrust available for the current phase of flight, in the current configuration of the aircraft and for the current anemometric conditions, and which is furnished with characteristic signs (7, 8), whose positions on the dial (6) respectively represent prescribed and actual thrusts which are expressed as a percentage of the maximum thrust.

11 Claims, 3 Drawing Sheets

FLIGHT CONTROL INDICATOR FOR AN AIRCRAFT, IN PARTICULAR A TRANSPORT AIRPLANE, INTENDED TO SUPPLY THE THRUST GENERATED BY AT LEAST ONE ENGINE OF THE AIRCRAFT

The present invention relates to a flight control indicator for an aircraft, in particular a transport airplane, intended to supply the thrust generated by at least one engine of the aircraft.

It is known that the designing of an airplane requires dialog between the aircraft manufacturer and the engine manufacturer. Specifically, the aircraft manufacturer specifies a suite of necessary thrusts to the engine manufacturer, based on the missions and on the performance that the airplane will have to fulfill. This suite of thrusts is dependent on the ambient conditions (pressures, temperatures) and operational conditions of the airplane (idling, cruising, climbing, take-off, etc.) but also on the bleeding of air for the climatization of the cabin and/or for the deicing of the wings and/or the nacelles. The engine manufacturer establishes, through calculations or trials, the engine thrust curves, as a function of the ambient conditions and of a physical characteristic of the engine, which is called the "engine control parameter" and which is used subsequently by a full authority engine regulating system of the FADEC type (Full Authority Digital Engine Control) for regulating the flow rate of fuel delivered to the engine. The suite of thrusts which is initially defined by the aircraft manufacturer is therefore transformed by the engine manufacturer into a suite of values of the engine control parameter, called the "thrust management table".

In current airplanes equipped with jet engines, the engine control parameter taken into account is displayed in the cockpit and used by the pilot to monitor the thrust of the engine. The engine control parameters, which are currently proposed by engine manufacturers, are:
- the speed of rotation N1 of the low-pressure module of the engine;
- the ratio of engine pressures (compressor inlet and turbine outlet) EPR ("Engine Pressure Ratio");
- the TPR ("Turbofan Power Ratio") ratio; and
- the torque.

When the pilot actuates the throttle or when the automatic pilot is engaged and prescribes the thrust of the engines, the corresponding order is sent to the FADEC system and is converted, as a function of the ambient conditions and of the air bleed, into a value of the control parameter corresponding to a prescribed thrust. This conversion uses said thrust management tables, which are stored in nonvolatile memories of the FADEC system.

For airplanes equipped with an automatic thrust management system, when this system is activated, the order sent to the FADEC system may be directly the value (prescribed) of the control parameter (EPR, N1, . . . ). Moreover, the actual value of said control parameter (EPR, N1, . . . ) is directly measured by one or more sensors installed on the engine and read by the FADEC system. The actual value of this parameter is thus also available to the FADEC system.

These two values representing the prescribed value and the actual value, are sent by the FADEC system to the computer in charge of managing the displays at the cockpit level. The monitoring of these two physical characteristics of the engine by the pilot makes it possible to verify that the prescribed thrust has indeed been reached by the engine.

It will be noted moreover that other parameters are also displayed in the cockpit: the maximum EPR ratio or the maximum N1 rating, making it possible to view the values of the N1 rating or of the EPR ratio that will be obtained when the pilot requests the maximum thrust available for the various phases of flight (take-off/go-around, climbing/cruising, continuous maximum and idling) as well as the limit N1 value corresponding to the maximum N1 rating which can be reached in the operating mode of the engine.

However, such a representation of the thrust of the engine in the cockpit, which is therefore implemented by way of an engine control parameter, representing a physical characteristic of said engine, exhibits numerous drawbacks.

Firstly, the engine control parameter (EPR or N1, for example) is a characteristic which varies considerably as a function of ambient conditions. At iso-thrust, the control parameter gives different values as a function of the ambient conditions or of the bleeding of air from the engine. Thus, in his pre-flight preparation, the pilot must calculate, as a function of the ambient conditions and of the data of the airplane, the value of the control parameter (EPR, N1, . . . ) that the engines will have to reach during the take-off phase.

Secondly, these control parameters which correspond to a physical characteristic of the engine, do not represent direct readouts of the thrust. An additional interpretation is therefore necessary by the pilot to translate such information into a thrust. In view of the difficulty described above, such an interpretation is almost impossible. For example, it is difficult:
- to evaluate the loss of thrust induced by an observed discrepancy between the actual value and the prescribed value, for example of 1% on a display of the N1 rating or of 0.01 on a display of the EPR ratio;
- to determine the additional thrust, available to the pilot if the throttle is pushed forward; and
- to know whether the maximum thrust has indeed been reached.

Thirdly, when air is bled off from the engine for the air conditioning of the cabin or the deicing of the wings or of the nacelle, it results in a decrease in the maximum available thrust, which corresponds to the energy bled off from the engine. This loss of thrust is impossible to quantify, in view of the aforesaid difficulties.

Moreover, fourthly, it is known that one and the same type of airplane may employ several different motorized actuators and, consequently, several different types of indications in the cockpit. Hence, it is not possible to provide just a single indicator for the displaying of the engine information, on all versions of said same type of airplane, employing several different motorized actuators.

The object of the present invention is to remedy these drawbacks. It relates to a universal flight control indicator, which is especially readable and understandable, and which is intended to supply the thrust generated by at least one engine of an aircraft.

For this purpose, according to the invention, said flight control indicator of the type comprising:
- information sources supplying at least information relating to a control parameter of the engine;
- means for processing information received from said information sources; and
- display means able to present information relating to said engine on at least one viewing screen, is noteworthy in that said information processing means determine, for said engine, at least:
- the maximum thrust which is available:
  - for the current phase of flight;

as a function of the current configuration of the aircraft; and for the current anemometric conditions;

the prescribed thrust; and the actual thrust, said prescribed and actual thrusts being expressed as a percentage of said maximum thrust, and in that said display means present, on said viewing screen, a dial which is graduated in percentage, whose maximum represents said maximum thrust, and which is furnished with first and second characteristic signs whose positions on said dial respectively represent said prescribed and actual thrusts.

By virtue of the invention, said flight control indicator exhibits very numerous advantages. In particular:

it is universal, since it determines and displays the thrust directly and not an engine control parameter, like the aforesaid known indicators, and is independent of the engine control parameter used. This makes it possible to provide just a single flight control indicator for one and the same type of airplane comprising different motorized actuators (and hence also different control parameters), this having the consequence of course of reducing the cost and moreover facilitates the training of pilots;

said indicator is a flight control indicator and not a simple engine monitoring indicator, since it supplies an operational thrust which takes account of the integration of the engine on the aircraft, doing so while functional. Said maximum thrust is defined as being the maximum thrust available to the pilot:

for the current phase of flight (take-off, cruising, climbing, etc.);

as a function of the current configuration of the aircraft (without air bleed); and for the present anemometric conditions.

One is therefore not dealing with a simple engine limit; and said flight control indicator allows simple, fast and easily understandable readout of the thrust available for the engine, this being especially advantageous in manual flight control mode in particular.

Furthermore, advantageously, said information processing means determine, moreover, a controlled thrust which is expressed as a percentage of said maximum thrust and which corresponds to the thrust representative of the position of the throttle of the aircraft, and said display means further present, on said viewing screen, a third characteristic sign whose position on said dial corresponds to said controlled thrust.

Additionally, in a particular embodiment, said information processing means determine, moreover, an auxiliary maximum thrust, and said display means furthermore present, on said viewing screen, a fourth characteristic sign, whose position on said dial corresponds to said auxiliary maximum thrust.

Furthermore, advantageously, said information processing means determine, moreover, an auxiliary minimum thrust and said display means furthermore present, on said viewing screen, a fifth characteristic sign, whose position on said dial corresponds to said auxiliary minimum thrust.

Preferably, said fourth and fifth characteristic signs delimit a circular sector which presents a color which is different from that of the background of said dial.

Additionally, advantageously, said information processing means determine the percentage THRx of a thrust x, for a forward thrust, from the following expression:

$$THRx = (FNx - FNwml)/|FN100 - FNwml|$$

where:

FNx represents the thrust corresponding to a control parameter of the engine;

FN100 represents the maximum forward thrust that the engine is capable of delivering without air bleed for the current phase of flight and the current configuration of the aircraft; and FNwml represents the thrust of the windmilling engine.

Of course, it is also conceivable for said display means to be able to present, on said viewing screen, at least one value of thrust digitally.

Additionally, for a configuration of the aircraft exhibiting a thrust reversal of the engine, advantageously, said dial presents a negative zone making it possible to present the thrusts relating to this configuration of the aircraft as thrusts of negative values.

Moreover, advantageously, during a thrust reversal of the engine, said information processing means determine the percentage THRx of a thrust x, from the following expression:

$$THRx = FNx/|FN100|$$

in which:

FNx represents the thrust corresponding to a control parameter of the engine; and FN100 represents the maximum reverse thrust that the engine is capable of delivering without air bleed for the current phase of flight and the current configuration of the aircraft.

This makes it possible to improve the ergonomics of the interface with the pilot as compared with current indicators which in such a case display a representation of the absolute value of the thrust due to the thrust reversal, associated with an indication of activation of the thrust reversal.

Additionally, in a particular embodiment, the flight control indicator in accordance with the invention comprises detection means which are able to detect an error in the thrust indication, and where said display means are able to present on said viewing screen an error indication, during the detection of an error by said detection means.

The figures of the appended drawing will elucidate the manner in which the invention may be embodied. In these figures, identical references designate similar elements.

Figure 1:
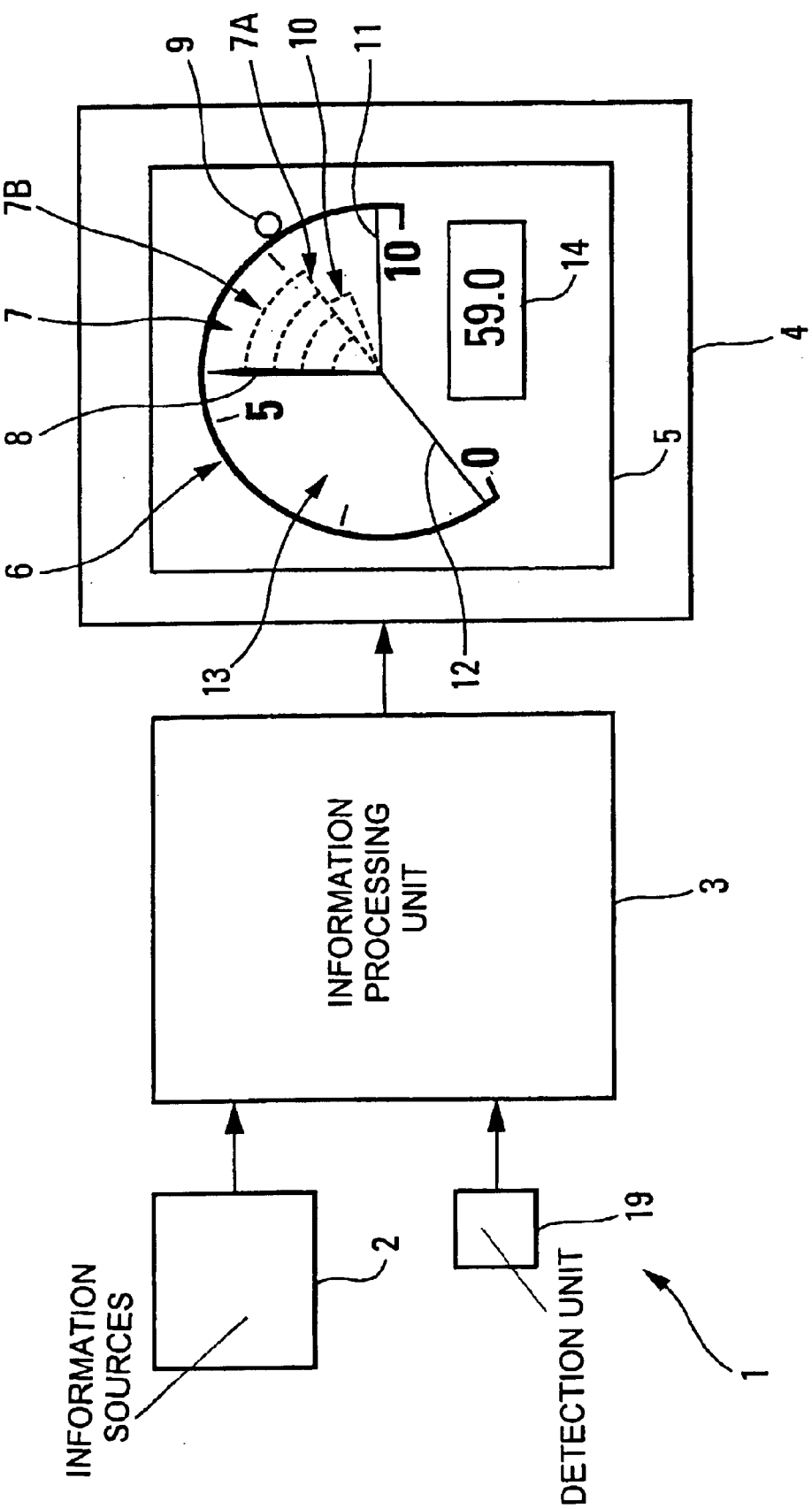
FIG. 1 is the schematic diagram of a flight control indicator in accordance with the invention.

The flight control indicator 1 in accordance with the invention and represented diagrammatically in FIG. 1 is intended to supply on an aircraft, in particular a civil transport airplane, the thrust generated by at least one engine (not represented) of said aircraft.

For this purpose, said flight control indicator 1 comprises in a known manner:

information sources 2 supplying at least information relating to a standard control parameter of the engine (EPR, N1, . . . ). In a preferred embodiment, said information sources 2 comprise a full authority engine regulating system of the FADEC type ("Full Authority Digital Engine Control"), which supplies the prescribed value and the actual value of said engine control parameter;

means 3 for processing information received from said information sources 2; and display means 4 able to present information relating to said engine on at least one viewing screen 5.

According to the invention:

said information processing means 3 determine, for said engine, at least:
  the maximum thrust THRmax which is available (without air bleed) for the current phase of flight (climbing, cruising, descent, etc.) in the current configuration (position of the slats, position of the flaps, etc.) of the aircraft and for the current anemometric conditions;
  the prescribed thrust THRcom; and
  the actual thrust THReff, said prescribed thrust THRcom and said actual thrust THReff being expressed as a percentage of said maximum thrust THRmax, and said display means 4 present, on said viewing screen 5, a dial 6 which is graduated in percentage (from 0% to 100%), whose maximum ("10", that is to say 100%) represents said maximum thrust THRmax, and which is furnished with characteristic signs 7, 8 whose positions on said dial 6 respectively represent said prescribed thrust THRcom and said actual thrust THReff.

In a preferred embodiment:

said characteristic sign 8 is a needle, for example green in color, whose position on the dial 6 indicates said thrust THReff; and said characteristic sign 7 comprises a needle 7A, whose position on said dial 6 indicates said thrust THRcom, as well as four arcs of circles 7B connecting this needle 7A to said needle 8. Said elements 7A and 7B are, for example, formed by green dashes.

In a particular embodiment, said information processing means 3 determine, moreover, a controlled thrust THRpil which is expressed as a percentage of said maximum thrust THRmax and which corresponds to the thrust representative of the position of the throttle (not represented) of the aircraft, and said display means 4 further present, on said viewing screen 5, a third characteristic sign 9 whose position on said dial 6 corresponds to said controlled thrust THRpil. Said characteristic sign 9, for example a blue circle, is aligned with the needle 7A of the characteristic sign 7. In a particular embodiment, a triangle 10 is also displayed, which is associated with said characteristic sign 7 and which indicates the direction of variation of the control.

It is also conceivable to dispense with the characteristic sign 7 when the thrust is stabilized. The prescribed thrust THRcom then corresponds to the controlled thrust THRpil and is indicated by said characteristic sign 9.

Additionally, said information processing means 3 determine, moreover, an auxiliary maximum thrust THRsup, and said display means 4 furthermore present, on said viewing screen 5, a characteristic sign 11, whose position on said dial 6 corresponds to said auxiliary maximum thrust THRsup.

Furthermore, said information processing means 3 determine, moreover, an auxiliary minimum thrust THRmin and wherein said display means 4 furthermore present, on said viewing screen 5, a characteristic sign 12, whose position on said dial 6 corresponds to said auxiliary minimum thrust THRmin.

Said characteristic signs 11 and 12 which correspond to radii or needles of said dial 6 delimit a circular sector 13 which presents a color (for example a gray color) which is different from that of the background of said dial 6 (for example of lighter color).

Figure 2:
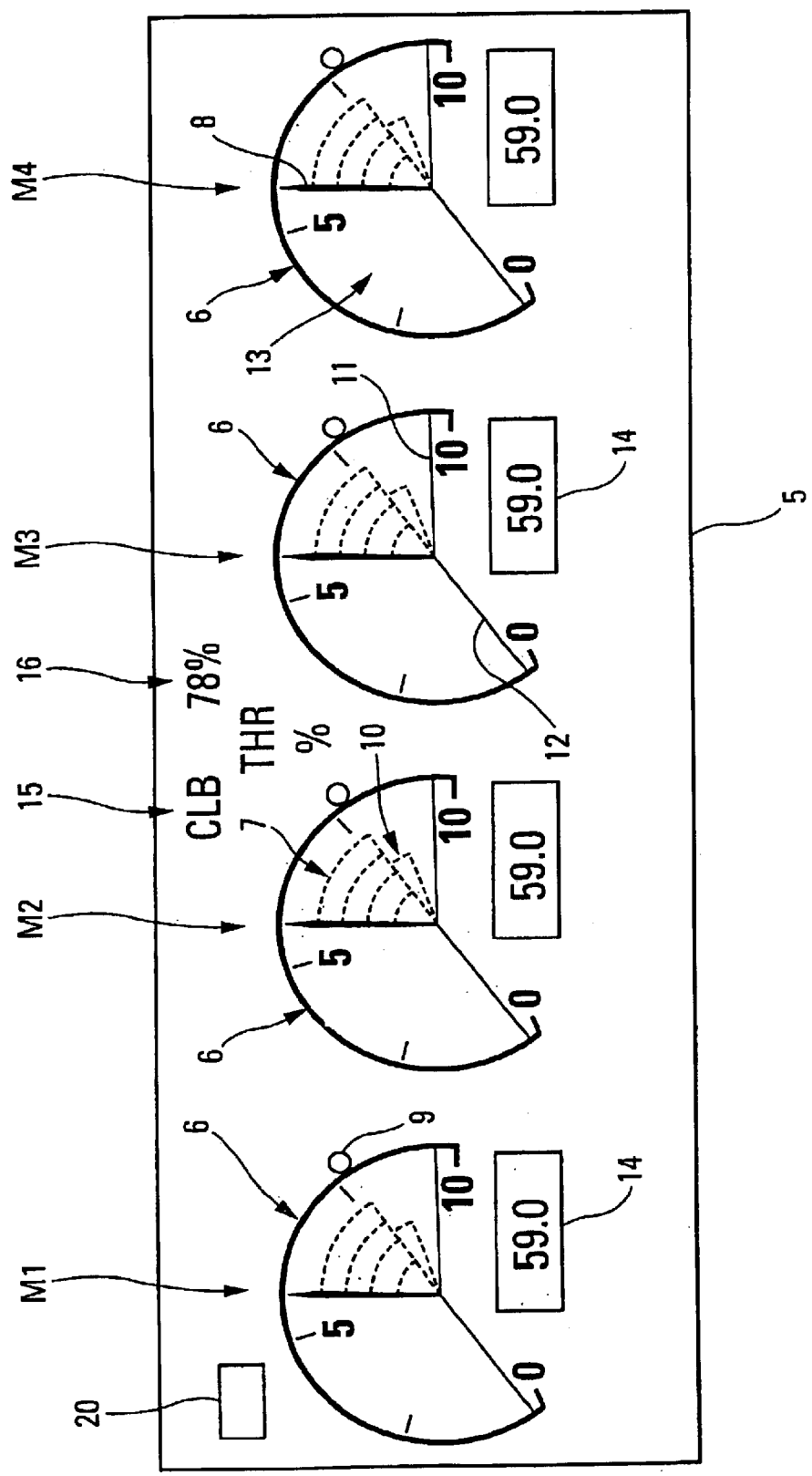
FIGS. 2 and 3 illustrate a viewing screen of a flight control indicator in accordance with the invention, for different configurations of the aircraft.
Figure 3:
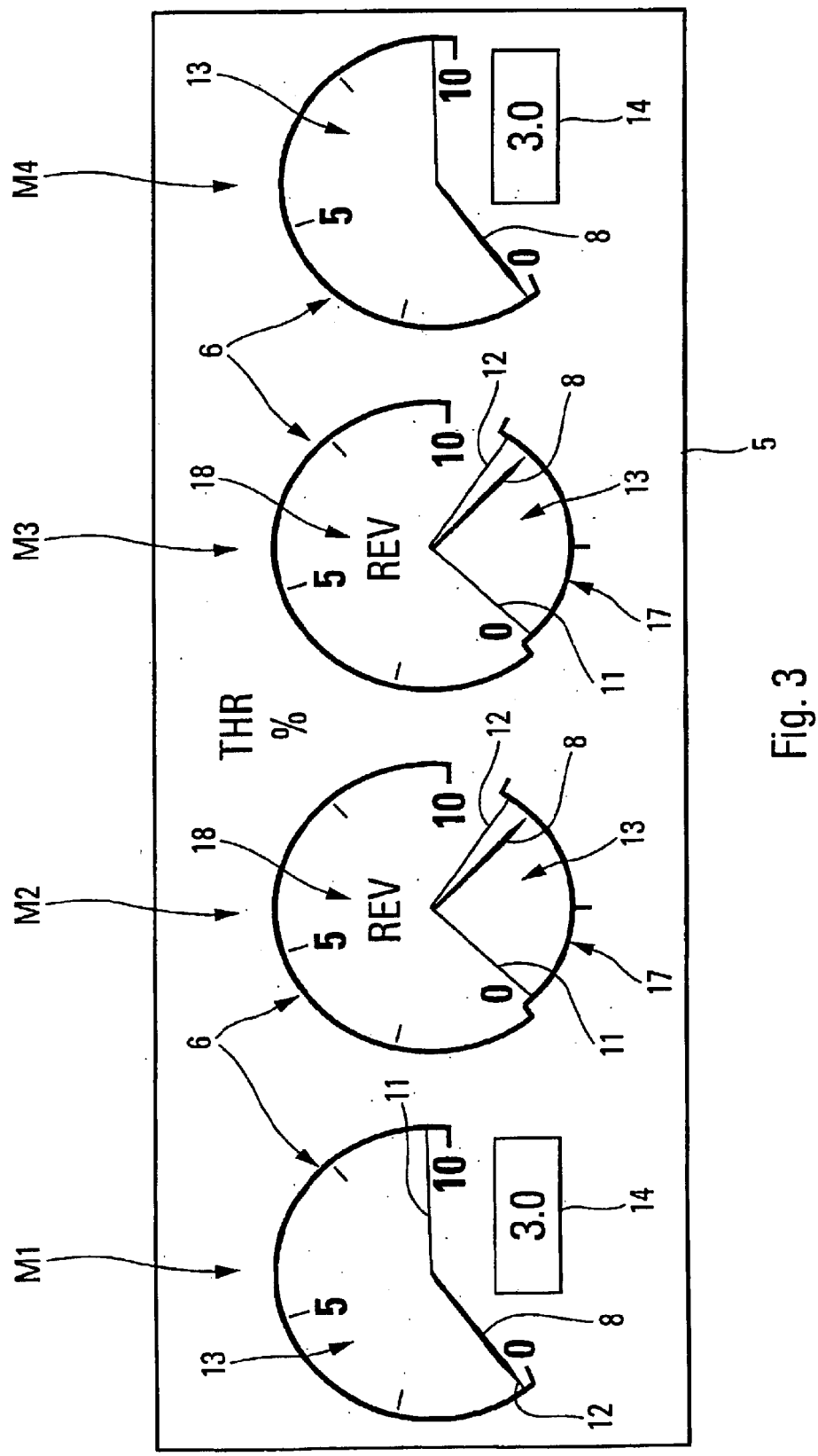

Within the framework of the present invention, the various values of thrust may also be displayed digitally, as represented for example for the prescribed thrust THRcom, whose value is displayed in a window 14 in FIGS. 1 to 3.

According to the invention, for a standard forward thrust configuration, said information processing means 3 determine said percentage THRx of a thrust x, from the following expression (1):

$$THRx = (FNx - FNwml)/|FN100 - FNwml|$$

where:

FNx represents the thrust corresponding to a control parameter of the engine, EPR or N1 for example, which is known by said information sources 2;

FN100 represents the maximum forward thrust that the engine is capable of delivering without air bleed for the current phase of flight and the current configuration of the aircraft; and FNwml represents the thrust of the windmilling engine, that is to say the thrust relating to the engine rotation obtained, after switching off, through the autorotation of the engine's compressor/turbine coupling.

Thus, a thrust expressed as a percentage THRx is calculated by using the corresponding thrust value FNx. By way of illustration:

to calculate THReff, one uses the actual thrust FNeff;

to calculate THRcom, one uses the prescribed thrust FNcom which is the thrust corresponding to the control parameter as prescribed (EPRcom or N1com);

to calculate THRpil, one uses the thrust FNpil corresponding to the position of the throttle;

to calculate THRsup, one uses the thrust FNsup which represents the maximum thrust that the engine is capable of delivering, taking into account the air bleed configuration, for the current phase of flight and the current configuration of flight; and to calculate THRmin, one uses the thrust FNmin existing when the engine is idling (in the forward sense).

In the particular embodiment represented in FIG. 1, the flight control indicator 1 in accordance with the invention displays only thrust information relating to a single engine of the aircraft.

Additionally, in a preferred embodiment represented in FIG. 2, which relates to a configuration of standard forward movement of the aircraft, the flight control indicator 1 displays the thrust information THR (expressed as a %) relating to all the engines M1, M2, M3, M4 of the aircraft. For this purpose, the viewing screen 5 displays a dial 6 for each of said engines M1 to M4.

It will be noted that, in this example, all the engines M1 to M4 exhibit the same thrust.

In this preferred embodiment, the display means 4 furthermore present, on the viewing screen 5:

an indication 15 of the operating mode of the engines, for example climbing ("CLB" being the abbreviation for the term "climb"); and a digital display 16 ("78%") of a limit thrust THRlim which represents the maximum thrust that can be reached in the operating mode of the engines.

The flight control indicator 1 in accordance with the invention also makes it possible to present thrust information when the configuration of the aircraft exhibits a thrust reversal. It is known that a thrust reversal is obtained through a diversion of the combustion gas or of the bypass flow through the fan of the engine toward the front. This diversion creates a counter-thrust serving to brake the aircraft during the landing phase. It is obtained by interposing buckets or louvres into the gas jet.

In such a case, as represented in FIG. 3, for each engine M2 and M3 which generates a thrust reversal, the corresponding dial 6 presents a negative zone 17 making it possible to present the thrusts relating to this configuration of the aircraft, as thrusts of negative values. Moreover, an indication 18 ("REV") is displayed to signal the thrust reversal of the corresponding engine M2, M3.

This makes it possible to improve the ergonomics of the interface with the pilot as compared with the standard indicators which in such a case display a representation of the absolute value of the thrust due to the thrust reversal, associated with an indication of activation of thrust reversal.

According to the invention, during a thrust reversal, said information processing means 3 determine the percentage THRx of a thrust x, from the following expression (2):

$$THRx = FNx / |FN100|$$

in which:

FNx represents the thrust corresponding to a control parameter of the engine; and FN100 represents the maximum reverse thrust that the engine is capable of delivering without air bleed for the current phase of flight and the current configuration of the aircraft.

In this case, to calculate THRsup (characteristic sign 11), one uses the reverse thrust delivered by the engine when idling, and to calculate THRmin (characteristic sign 12), one uses the maximum reverse thrust that the engine is capable of delivering, taking into account the air bleed configuration for the current phase of flight and the current configuration of flight.

To calculate the other thrust information THRx, one uses the aforesaid thrusts FNx, this time of course applied to the above expression (2).

In a particular embodiment, the flight control indicator 1 in accordance with the invention furthermore comprises detection means 19 which are represented in FIG. 1 and which are able to detect an error in the thrust indication, and said display means 4 are able to present on said viewing screen 5 an error indication, for example in a window 20 such as represented in FIG. 2, during the detection of such an error by said detection means 19.

In a preferred embodiment, said detection means 19 are means of calculation which are integrated into the information processing means 3.

What is claimed is:

1. A flight control indicator for an aircraft, intended to supply the thrust (THR) generated by at least one engine of the aircraft, said flight control indicator (1) comprising:

information sources (2) supplying at least information relating to a control parameter of the engine;

means (3) for processing information received from said information sources (2); and display means (4) able to present information relating to said engine on at least one viewing screen (5), wherein said information processing means (3) determine, for said engine, at least:

the maximum thrust which is available for the current phase of flight, as a function of the current configuration of the aircraft and for the current anemometric conditions;

the prescribed thrust; and the actual thrust, said prescribed and actual thrusts being expressed as a percentage of said maximum thrust, and wherein said display means (4) present, on said viewing screen (5), a dial (6) which is graduated in percentage, whose maximum represents said maximum thrust, and which is furnished with first and second characteristic signs (7, 8) whose positions on said dial (6) respectively represent said prescribed and actual thrusts.

2. The flight control indicator as claimed in claim 1, wherein said information processing means (3) determine, moreover, a controlled thrust which is expressed as a percentage of said maximum thrust and which corresponds to the thrust representative of the position of the throttle of the aircraft, and wherein said display means (4) further present, on said viewing screen (5), a third characteristic sign (9) whose position on said dial (6) corresponds to said controlled thrust.

3. The flight control indicator as claimed in claim wherein said information processing means (3) determine, moreover, an auxiliary maximum thrust, and wherein said display means (4) furthermore present, on said viewing screen (5), a fourth characteristic sign (11), whose position on said dial (6) corresponds to said auxiliary maximum thrust.

4. The flight control indicator as claimed in claim 3, wherein said fourth and fifth characteristic signs (11, 12) delimit a circular sector (13) which presents a color which is different from that of the background of said dial (6).

5. The flight control indicator as claimed in claim 1, wherein said information processing means (3) determine, moreover, an auxiliary minimum thrust and wherein said display means (4) furthermore present, on said viewing screen (5), a fifth characteristic sign (12), whose position on said dial (6) corresponds to said auxiliary minimum thrust.

6. The flight control indicator as claimed in claim 1, wherein said information processing means (3) determine the percentage THRx of a thrust x, for a forward thrust, from the following expression:

$$THRx = (FNx - FNwml) / |FN100 - FNwml|$$

where:

FNx represents the thrust corresponding to a control parameter of the engine;

FN100 represents the maximum forward thrust that the engine is capable of delivering without air bleed for the current phase of flight and the current configuration of the aircraft; and FNwml represents the thrust of the windmilling engine.

7. The flight control indicator as claimed in claim 1, wherein said display means (4) are able to present, on said viewing screen (5), at least one value of thrust digitally (14).

8. The flight control indicator as claimed in claim 1, for a configuration of the aircraft exhibiting a thrust reversal of the engine, wherein said dial (6) presents a negative zone (17) making it possible to present the thrusts relating to this configuration of the aircraft as thrusts of negative values.

9. The flight control indicator as claimed in claim 8,
wherein, during a thrust reversal of the engine, said information processing means (3) determine the percentage THRx of a thrust x, from the following expression:

$$THRx = FNx/|FN100|$$

in which:
- FNx represents the thrust corresponding to a control parameter of the engine; and
- FN100 represents the maximum reverse thrust that the engine is capable of delivering without air bleed for the current phase of flight and the current configuration of the aircraft.

10. The flight control indicator as claimed in claim 1, which furthermore comprises detection means (19) which are able to detect an error in the thrust indication, and where said display means (4) are able to present on said viewing screen (5) an error indication, during the detection of an error by said detection means (19).

11. An aircraft,
which comprises a flight control indicator (1) such as that specified under claim 1.

* * * * *